United States Patent [19]
Brockett et al.

[11] Patent Number: 5,195,604
[45] Date of Patent: Mar. 23, 1993

[54] ALL WHEEL DRIVE VEHICLE WITH INDEPENDENT WHEEL BRAKING

[75] Inventors: David J. Brockett, Milwaukie; Thomas M. Telford, Gladstone, both of Oreg.

[73] Assignee: Warn Industries, Inc., Milwaukie, Oreg.

[21] Appl. No.: 716,120

[22] Filed: Jun. 17, 1991

[51] Int. Cl.⁵ .................................................. B60K 23/08
[52] U.S. Cl. .................................. 180/248; 180/244
[58] Field of Search .................... 180/248, 244, 249; 192/38, 36, 44

[56] References Cited

U.S. PATENT DOCUMENTS

| | | | |
|---|---|---|---|
| 3,055,471 | 9/1962 | Warn et al. | 192/38 X |
| 3,581,597 | 6/1971 | Reieragaard. | |
| 3,700,082 | 10/1972 | Schwab. | |
| 3,935,753 | 2/1976 | Williams. | |
| 3,941,199 | 3/1976 | Williams. | |
| 3,972,633 | 8/1976 | Wright. | |
| 3,993,152 | 11/1976 | Fogelberg. | |
| 4,124,085 | 11/1978 | Fogelberg | 180/249 |
| 4,222,472 | 9/1980 | Telford. | |
| 4,223,772 | 9/1980 | Telford. | |
| 4,605,087 | 8/1986 | Ashauer et al. | 180/248 |
| 4,867,260 | 9/1989 | Cameron et al. | 180/249 X |
| 5,007,498 | 4/1991 | Wiese et al. | 180/248 |

OTHER PUBLICATIONS

Design News/Oct. 1, 1990/Automotive Issue pp. 178, 179 Clutches Make Possible 'Smart' All-Wheel Drive Charles J. Murray, Midwest Editor.

Primary Examiner—Johnny D. Cherry
Assistant Examiner—Joseph D. Pape
Attorney, Agent, or Firm—Robert L. Harrington

[57] ABSTRACT

A clutch mechanism for the drive train of a four-wheel drive vehicle for controlling the application of braking power between the front and rear wheels as applied through the drive train. A driving shaft is connected to a driven shaft through a roller clutch assembly and the driven shaft is coupled to a wheel set equipped with anti-lock brakes. The driving shaft has a drive cam race and a driven shaft has a cylindrical race. A cage carries the clutch rollers and is provided with drag shoes biased against a fixed drag ring. The rollers captured by the cage continuously drag against the rotative urging of the driving shaft whereby the rollers engage the cylindrical race with the driving shaft inducing driving rotation of the driven shaft, and disengage with the driving shaft inducing braking rotation of the driven shaft.

12 Claims, 2 Drawing Sheets

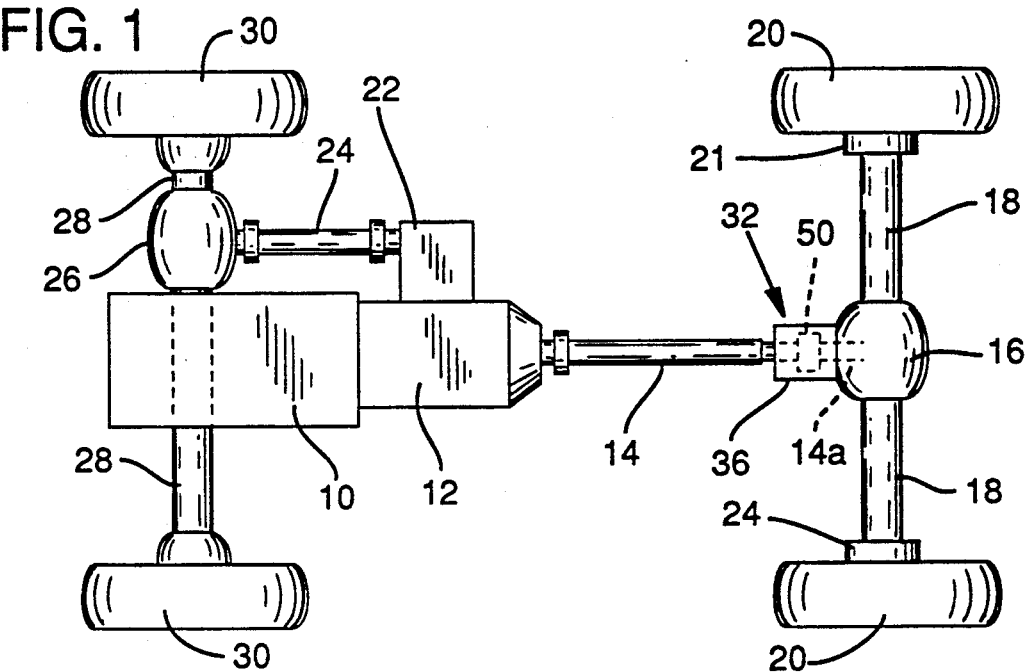
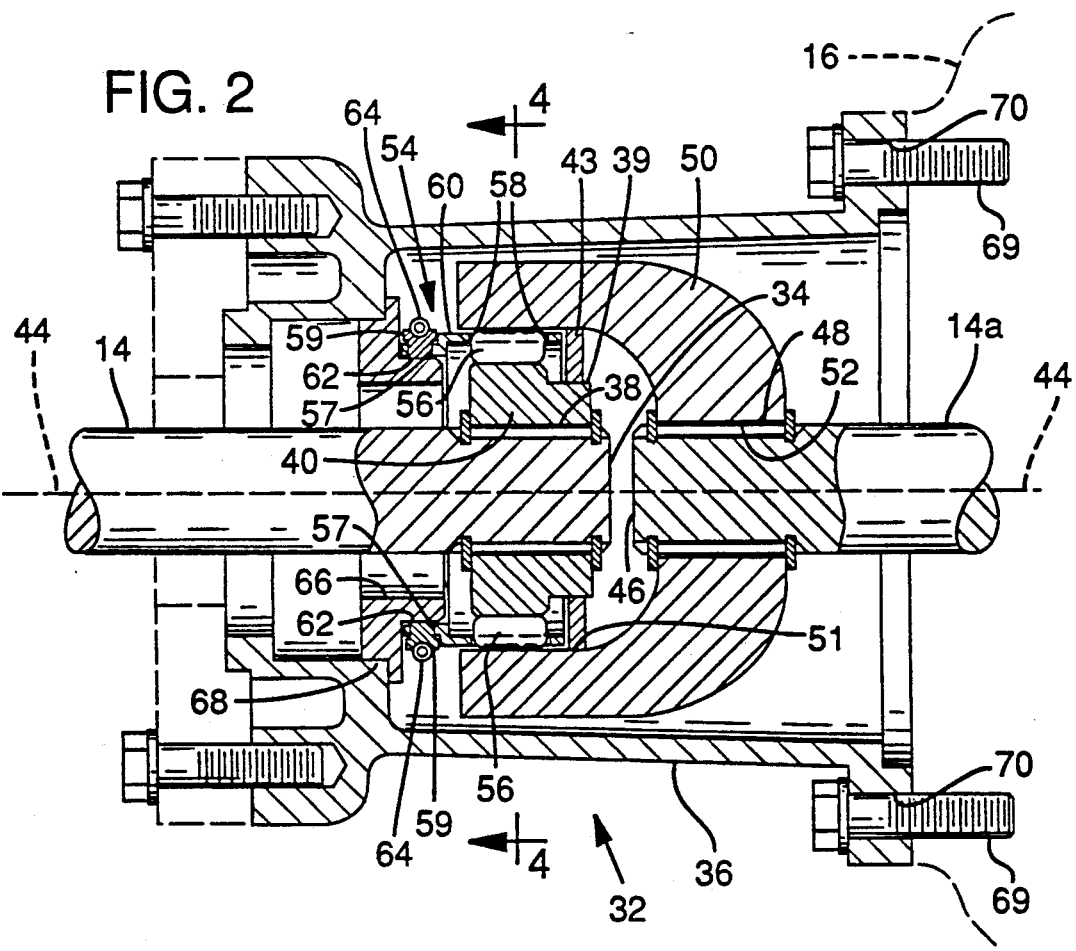

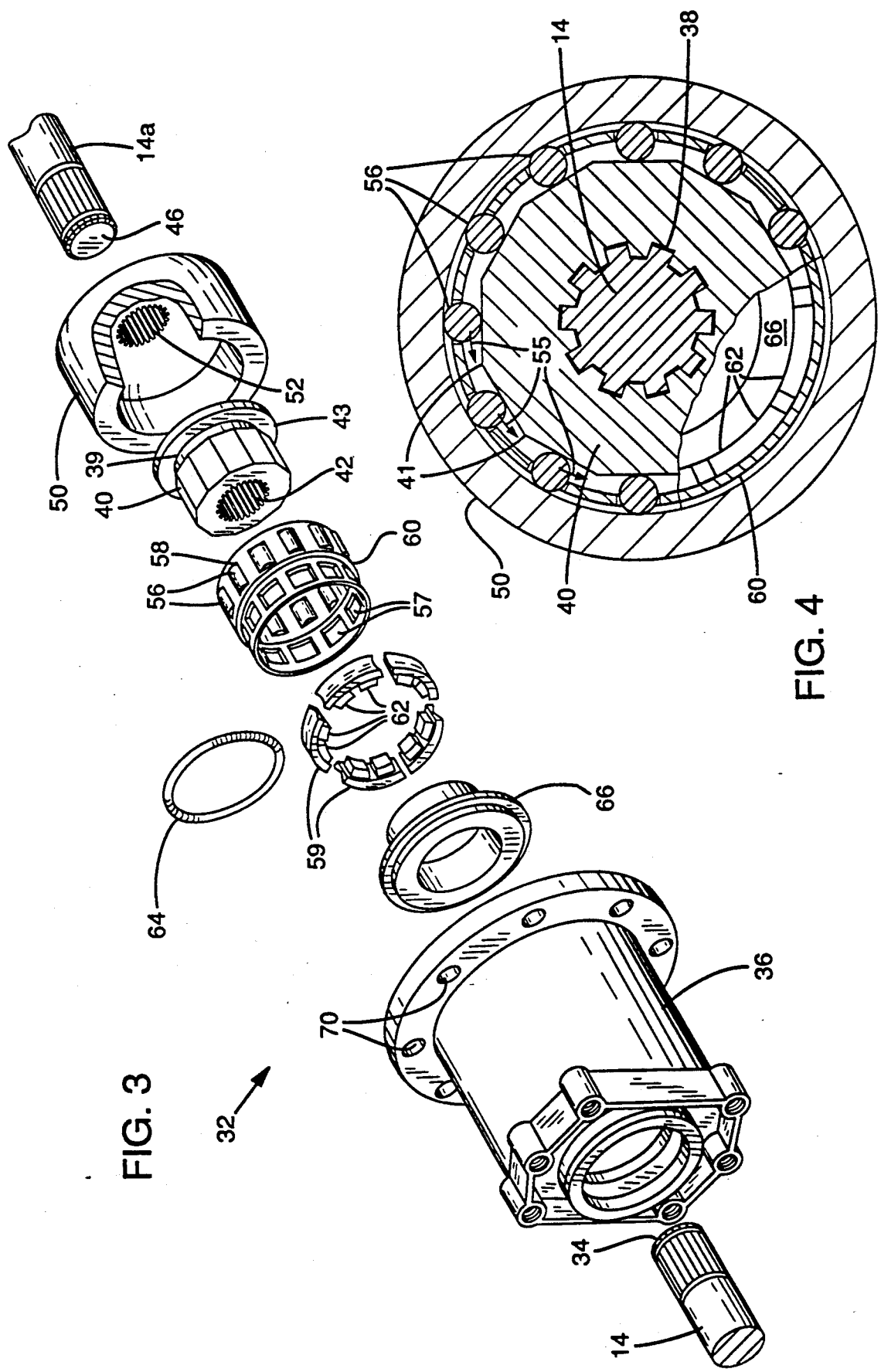

ALL WHEEL DRIVE VEHICLE WITH INDEPENDENT WHEEL BRAKING

FIELD OF INVENTION

This invention relates to a roller clutch mechanism applied between driving and driven propeller shaft portions of a vehicle wherein the shaft portions are disengaged when the driven shaft portion overruns the driving shaft portion, the clutch mechanism and its disengagement function being operative in either rotative direction and primarily applicable to a four-wheel drive vehicle equipped with anti-lock brakes.

BACKGROUND OF INVENTION

A desirable feature for vehicles is the provision of all-wheel drive. A vehicle's transmission engages the motor to the front wheels and extends rearward, (e.g. via a propeller shaft) to the rear wheels. The benefit of all-wheel drive is increased traction which provides increased safety when driving under slippery road conditions and when driving through off-road terrain where two-wheel drive vehicles are likely to get stuck (e.g. in snow or mud).

A second desirable feature is the provision of anti-lock brakes. Anti-lock brakes prevent skidding. Both braking ability and driver control are detrimentally effected when the wheels lock and thus skid on the road surface. Anti-lock brakes may be beneficially applied to both front and rear brakes but the major benefit can be achieved by applying the anti-lock brakes to the rear wheels only.

However, a problem occurs when equipping vehicles with both all-wheel drive and anti-lock brakes. Because the front and rear wheels are coupled together, any torque that is applied to one set of wheels (e.g. the front wheels) is transmitted through the drive train to the other set of wheels (e.g. the rear wheels). In the instance of braking, it may be a serious disadvantage to have the braking torque that is applied to the front wheels transmitted to the rear wheels which can interfere with the anti-lock function.

One clear example of the disadvantage of coupling these features is where the vehicle is equipped with all-wheel drive and the rear wheels only are equipped with anti-lock brakes. A panic induced braking situation may result in the front wheels becoming locked. Whereas the anti-lock brakes would typically prevent locking of the rear wheels, because the drive train is coupled to the front wheels the drive train is forced to retard its rotation and the coupling of the drive train to the rear wheels accordingly retards the rear wheels (perhaps to the point of locking) regardless of the anti-lock braking action applied to the rear wheels. The anti-lock feature is thereby effectively negated.

The present invention accordingly has as an objective to accommodate the anti-lock braking feature by the discriminate decoupling of the front and rear wheel sets during the braking action. That is, the wheels are to be coupled when driving action is desired and decoupled when braking action is desired.

One further concern that needs to be addressed, however, is the desirability of engine braking during a desired deceleration of the vehicle, e.g., coasting down hill. Whereas such engine braking may be desirable for both front and rear wheels, it is considered important that at least one of the wheel sets remain engaged for engine braking. Thus, decoupling of the wheels is intended in the present invention for one wheel set only. If the decoupling is applied to a part-time four-wheel drive, the wheel set that is disengaged from the drive train for driving should also be the wheel set that is decoupled for braking.

It follows that in an all-time all-wheel drive vehicle equipped with rear wheel anti-lock brakes, the rear wheel set should be decoupled from the effect of the front wheels. Whereas engine braking is sacrificed to accommodate the anti-lock braking feature, it is only true for one of the wheel sets and in balance, the combination of features is desirable regardless of the reduction in engine braking.

The present invention is not the first to recognize the desirability of decoupling the drive train between the front and rear wheels on an all-wheel drive vehicle. The Chrysler Corporation explained this desirable feature in an article published in the Oct. 1, 1990 automotive issue of Design News. In that article, Chrysler disclosed a clutch mechanism that was incorporated into the rear propeller drive shaft of an all-wheel drive vehicle. The clutch mechanism caused the rear wheels to be engaged by the propeller drive shaft when the rotative force of the propeller drive shaft was driving the wheels and it provided disengagement when the propeller drive shaft tried to retard the wheels. However as also explained, that same mechanism operated in one rotative direction only. When the vehicle was driven in reverse whereby the drive shaft was rotatively reversed, the mechanism disengaged the rear wheels from the drive axle in the driving mode, a serious drawback for the vehicle when attempting to back out of a "stuck" condition. This problem was addressed and overcome by Chrysler with an auxiliary by-pass mechanism applicable only in the special case of providing driving engagement to the rear wheels with the vehicle driven in reverse. This mechanism is disclosed in U.S. Pat. No. 4,867,260.

BRIEF SUMMARY OF INVENTION

In the preferred embodiment, the vehicle is equipped with anti-lock brakes and a roller clutch mechanism provides one-way clutch engagement between two shafts in the vehiele's drive train (one a driving shaft and the other a driven shaft) which functions whether the vehicle is driven in forward or reverse. One shaft is provided with an outer race and the other with an inner race with the clutch rollers positioned between the races. The race of the driving shaft portion is cam shaped (the other being cylindrical or circular) to provide a configured raceway having alternating portions of restrictive and opened spacings. The rollers are movable in the raceway between the positions of restrictive spacing except for the provision of the friction members hereafter described. The rollers would otherwise become wedged between the two races at either the braking or leading positions of restrictive spacing and the two shafts thereby inter-engaged. In the intermediate positions of opened spacing, the rollers are free to move relative to the cylindrical race and the two shafts have independent rotative movement.

The rollers are captured in slots of a cage and the cage has frictional engagement with a non-rotating member affixed to the vehicle. Whichever the direction of rotation of the shaft portions (the shaft portions rotating in a common direction as dictated by the vehicle movement), the rollers are urged toward the trailing restrictive positions of the cam configured race. With the cylindrical race (of the driven shaft portion) wanting to rotate slower than the cam race, the rollers nest in the restricted position and couple the two shaft portions. With the cylindrical race rotating faster than the cam race, the rollers are urged to the intermediate position where disengagement occurs and where the dragging effect of the cage controls the roller cage movement, i.e., it retards the rotative movement. Movement of the rollers past the intermediate position is thereby prevented. This same action occurs regardless of the direction of rotation, i.e., regardless of the vehicle moving in forward or reverse and in either event the anti-lock brakes of the decoupled wheel set are able to function without interference of the other wheel set.

The Prior Art

Roller clutches are not new. Roller clutches have been used for differentials in which application they allow limited independent rotation as between the drive axles of the two wheels of the same wheel set (i.e. between the front wheels or between the rear wheels). One drive axle does not drive the other drive axle (both are driven by a propeller drive shaft) and as concerns either of the drive axles, free independent rotation is not provided relative to the propeller drive shaft. This application does not address the concern of forced retardation of one of the wheel sets by the other wheel set in an all-wheel drive vehicle. Representative of such differential roller clutch arrangements are found in U.S. Pat. No. 3,581,597 (Reiersgaard), U.S. Pat. No. 3,700,082 (Schwab), U.S. Pat. No. 3,935,753 (Williams) and U.S. Pat. No. 3,941,199 (Williams).

Roller clutches have also been applied to locking hubs for locking, e.g. the front wheels to the front-wheel drive axles of a part-time four-wheel drive vehicle. These can be found in U.S. Pat. No. 3,055,471 (Warn, et al), U.S. Pat. No. 3,972,633 (Wright), U.S. Pat. No. 4,222,472 (Telford) and U.S. Pat. No. 4,223,772 (Telford). The wheel carries one race and the drive axle another. It is to be noted, however, that it is desirable for clutches utilized as locking hubs to provide for the clutch to stay engaged throughout vehicle movement to enable engine braking of the engaged vehicle. The roller clutch disengages in the situation where engine braking otherwise occurs, i.e., in a coast mode and accordingly in this locking hub application, disengagement is an undesirable feature.

Roller clutches have been replaced by non-releasable locking hubs (non-releasable in the coast mode) for other reasons as well. The wheels are subjected to a higher torque than the drive train between the differentials and the wheels are bounced more severely than the drive train when encountering roadway irregularities. In general, the roller clutch is more susceptible to malfunction under the rougher conditions encountered at the wheel ends. Furthermore, the roller clutch assembly design at the wheel end is constrained in overall dimension by the wheel hub opening to a much greater extent than within the drive train. The roller clutch can thus be designed with sufficient bulk to more favorably accommodate the roller clutch characteristics. Most importantly, however, is the fact that disengagement is undesirable at the wheel end and thus, the features of the roller clutch that are benefits to the present invention are the same features that are undesirable in a hub lock application.

The disclosure of U.S. Pat. No. 4,124,085 (Fogelberg) utilizes a roller clutch for transmitting power from one propeller shaft to another for the purpose of engaging front wheel drive when the rear wheels are slipping. The roller clutch cage is frictionally coupled to the driven shaft. A cammed race on the driving shaft effects engagement when the driving shaft rotates faster than the driven shaft. This arrangement, however, can also produce engagement when the driven shaft overruns the driving shaft and is undesirable. Such engagement is prevented in the Fogelberg device by the inclusion of a latching member that blocks the roller cage when the driven shaft overruns the driving shaft. It does not provide the simplicity of a dragging force applied to the roller cage from a non-rotatable drag ring to inherently prevent the rollers from passing beyond the intermediate position of disengagement. Furthermore, it also relates to an application where decoupling is not desired and is likely the reason for its absence from the market. Fogelberg was obviously not contemplated for an application utilizing the decoupling feature, e.g. decoupling to avoid interference with anti-lock braking of the effected wheel set.

The present invention will be more clearly understood and appreciated with references to the following detailed description and the accompanying drawings.

FIG. 1 is a schematic illustration of a drive system of a motor vehicle incorporating a preferred embodiment of the present invention;

FIG. 2 is a section view of the clutch mechanism of the present invention incorporated into the drive system of FIG. 1;

FIG. 3 is an exploded view of the clutch mechanism of FIG. 2; and

FIG. 4 is a cross sectional view as taken on view lines 4—4 of FIG. 2.

DESCRIPTION OF THE PREFERRED EMBODIMENT

FIG. 1 of the drawings schematically illustrates the drive mechanism for an all-wheel drive vehicle such as contemplated for the present invention. (However, the reader will appreciate that various drive train systems could be used for this illustration, e.g. the drive train illustration of FIG. 1 of U.S. Pat. No. 4,867,260.) The rotative power of the vehicle engine 10 is transmitted to the rear wheels 20 by the transmission 12 rotating the propeller shaft 14 coupled to the rear differential 16. Axles 18 extending from the differential 16 rotate the rear wheels 20. Rear wheels 20 are equipped with anti-lock brakes (schematically illustrated as item 21) as that term is known and well understood in the trade. The rotative power of the engine 10 is transmitted to the front wheels 30 by a transfer case 22 (coupled to the transmission 12) that rotates the front propeller shaft 24 coupled to the front differential 26. Axles 28 extending from the differential 26 rotate the front wheels 30. The above illustration and explanation is very general and is intended only to provide the reader with an understanding of where the clutch mechanism may be incorporated (by way of example) into a vehicle's drive train. Numerous alternative arrangements will be apparent to those skilled in the art.

While operated in typical four-wheel or all-wheel drive, the front propeller shaft 24 is coupled to the rear propeller shaft 14 (through the linkage of transmission 12 and transfer case 22). In the event that brakes are applied to front wheels 30 in a panic mode so as to lock the wheels 30, rotation of the propeller shaft 24 is stopped. Propeller shaft 14 is also forced to retard its rotation and except for the clutch mechanism 32 to be hereafter explained, the rear wheels are forced into a locked or retarded mode irrespective of the anti-lock brakes incorporated therein.

Mechanism 32 is inserted into the propeller shaft 14. A propeller shaft extension 14a is a continuation of shaft 14 but only through the actuation of clutch mechanism 32. As explained in U.S. Pat. No. 4,867,260 (which explanation is incorporated herein by reference), the function of clutch mechanism 32 is to transmit torque from main propeller shaft 14 to extension 14a as long as that torque is applying driving torque, and to decouple shaft 14 from extension 14a when the torque is a retarding torque. This controlled coupling-decoupling of the drive shaft 14 with extension 14a is desirable when driving the vehicle forward or in reverse.

Reference is now made to all of the figures. FIGS. 2, 3 and 4 disclose the components of mechanism 32. As illustrated, propeller shaft 14 (the driving shaft) has an end 34 that terminates inside housing 36. The periphery of shaft 14 adjacent end 34 is provided with splines 38, and an inner race (referred to herein as a drive cam 40) having mated splines 42 is spline fit to shaft 14.

Shaft extension 14a (the driven shaft) as shown in FIG. 2, is mounted in end-to-end relationship with shaft 14, i.e. along the same axis 44 and extends from housing 36 into the rear differential 16. End 46 of shaft extension 14a is provided with splines 48 and mated splines 52 provided in outer race 50 are spline fit to splines 48 of shaft extension 14a.

As illustrated in FIG. 2, the outer race 50 of shaft extension 14a encircles in spaced relation the drive cam 40 of propeller shaft 14. Mounted between the outer race 50 and drive cam 40, within the spacing therebetween, is a roller clutch assembly designated in general by arrow 54 in FIG. 2. The roller clutch assembly includes rollers 56 that are captured within the slots 58 of a cage 60. The cage 60 is extended forwardly of rollers 56 and provided with transverse openings 57. Drag shoe segments 59 carry drag shoe portions 62 projected through openings 57. Surrounding the drag shoes 62 is a wrap spring 64 which continuously urges the drag shoes 62 inwardly toward drag ring 66. The constant spring pressure of the wrap spring 64 insures frictional engagement during the life of the shoes, i.e. to accommodate wearing. Piloting of the drive cam 40 and outer race 50 is provided by a cylindrical extension 39 of the drive cam 40 and a pilot bushing 43 that extends radially from the cylindrical extension 39 to the inner surface 51 of the outer race.

The drag ring 66 is mounted in the housing 36 and is press fit onto an annular shoulder 68 formed within the housing 36. The housing 36 is stationary relative to the vehicle, i.e., it is bolted to the casing of the rear differential 16 (schematically illustrated by dash line only in FIG. 2) with bolts 69 projected through bolt holes 70. With this arrangement of components it will be observed that the cage 60 and rollers 56 are permitted to rotate, the drag shoes 62 being extended from the cage 60 rotate with the cage, and whereas the drag shoes 62 frictionally engage the drag ring 66, the drag ring itself is fixed, i.e., it does not rotate.

Because the cage 60 is continuously being dragged by its frictional contact with drag ring 66, the cage 60 is urged to its rearward most position relative to the restrictions 41 on the drive cam 40. In FIG. 4, if the drive cam 40 is driven clockwise, the rollers 56 will be urged rearward as indicated by arrows 55 and engagement between shafts 14 and 14a will occur when rollers 56 are wedged between the trailing restrictions 41 and the outer race 50. When the outer race 50 is induced to overrun the drive cam 40, the outer race will urge the rollers 56 forward, i.e., opposite to arrows 55. The rollers will move until the rollers disengage and the outer race will then rotate independent of the drive cam, this position of the rollers being shown in FIG. 4.

The rollers will never move forward to the leading restriction 41 in that the drag shoes 62 engaging drag ring 66 apply continuous rearward urging of the cage 60 and rollers 58. As long as the outer cylindrical race is overrunning the inner cam race, there will be some rubbing on the rollers 58 as the rollers continue to be urged to the rear position. This rubbing action has no detrimental effect and simply achieves a balance between the forward urging by the outer race and the rearward urging by the frictional engagement of drag ring and drag shoes.

As previously explained, the advantage of the roller cage clutch engagement as applied to the rear wheel's drive shaft is to prevent interference with the rear wheel braking action. The rear wheels are driven when the propeller shaft 14 engages shaft extension 14a through the roller clutch mechanism. Such engagement occurs only so long as propeller shaft 14 is urging driving rotation of extension 14a, i.e., with the rollers 56 clamped between the trailing restriction 41 of drive cam 40 and the cylindrical surface of outer race 50. In an event such as panic braking, the front wheel brakes may lock the front wheels without the back wheel brakes locking the rear wheels. In such an event, because propeller shaft 14 is linked to propeller shaft 24, and because shaft 24 is engaged with the front wheels, braking of the front wheels applies a retard torque to propeller shaft 14 which would transmit a stopping or retard torque to the rear wheels 20 except for the action of the roller clutch mechanism 32.

Regardless of the fact that the drive cam 40 rapidly decelerates in such a condition, the rollers 58 will be urged to follow that deceleration due to the action of the drag shoes on the drag ring. The outer race 50 will decelerate only as dictated by the rear wheel braking action which, if less than that of the front wheels, (as when the rear wheels have anti-lock brakes) will result in the outer race overrunning the drive cam. As explained, this results in disengagement and the rear wheels are thereby permitted braking action independent of the front wheels.

It will be appreciated that during normal operation the drag shoes 62 are in continuous frictional engagement with the drag ring 66. Care must be taken to avoid too much or too little contact. Too much friction will cause rapid wearing and power loss. Too little contact will render the mechanism non-functional. Even when properly adjusted, care must be taken in the brake shoe design to avoid the problem of performance deterioration as the shoes wear. Accordingly, the brake shoe design as incorporated into the preferred embodiment must accommodate these conditions.

As shown in FIG. 3, drag shoes 62 are formed on drag shoe segments 59. The segments are separated to accommodate a wear-induced decreasing circumference of the arranged ring of segments as illustrated. The shoe portions (shoes) 62 are projected through openings 57 and are urged against the drag ring by wrap spring 64. This design has proven reliably effective to produce a minimum but adequate dragging friction. Design changes ar easily made by modifying the engaging surfaces on the drag shoes and drag ring and/or using a stronger or weaker wrap spring 64. As wear occurs, the wrap spring 64 accommodates the wearing and insures contact of the brake shoes against the drag ring.

The above drag shoe and drag ring design are subject to numerous variations. For example, the shoes (and wrap spring) might be fixed in non-rotative position and in such event the drag ring is carried by the roller cage. The shoes may operate on an inside surface of the drag ring rather than the outside surface as shown. The housing might be a rotating housing and the drag ring (or shoes) anchored to some other non-rotating part of the vehicle.

Numerous design changes are accordingly possible without departing from the invention which can be characterized in general as the application of a roller clutch to control coupling/decoupling of a front to rear wheel drive shaft (or vice versa), for preventing interference of the rear wheel braking (anti-lock brakes) having a preferred form whereby the roller clutch utilizes a roller cage that is frictionally anchored to a non-rotating surface for insuring the coupling action in either direction of vehicle movement. The invention, however, is specifically defined in the claims appended hereto and should be referred to for that purpose.

We claim:

1. In a vehicle having a drive train rotatively interconnecting front and rear differentials of front and rear wheel sets, said vehicle adapted to be driven in either forward or rearward direction of travel and said drive train correspondingly driven in alternate directions of rotation, and said front and rear wheel sets equipped with brakes for effecting independent braking action as between the front and rear wheel sets, said driving train including;

a driving shaft and a driven shaft and a clutch mechanism which couples the driving shaft and driven shaft when the driving shaft overdrives the driven shaft in either direction of rotation and which uncouples the driving shaft and driven shaft when the driven shaft overdrives the driving shaft in either direction of rotation, said driving shaft having an end terminating at a position between said differentials, said driven shaft having an end adjacent the driving shaft end and extended toward one of said differentials of one of said wheel sets, and said clutch mechanism comprising;

an inner race member attached to one of said shaft ends and an outer race member attached to the other of said shaft ends and surrounding said inner race member in spaced relation and forming therewith a circular raceway, the race member provided on the end of said driving shaft end configured with cam surfaces to provide said raceway with alternating positions of restricted and opened spacings, a rotatable cage and a plurality of rollers carried by said cage, said rollers positioned in said raceway at said cam surfaces and said rollers having a diameter larger than said positions of restricted spacings and smaller than said positions of opened spacings, a drag ring having a circular surface concentric with said rotatable cage, drag shoes in frictional engagement with said circular surface of said drag ring, one of said drag shoes and drag ring carried by said cage and the other in fixed non-rotative relation to said cage whereby the rollers are rotatably driven by the race member of said driving shaft end as dictated by the rotation of the drive train, said clutch mechanism responsive to a driving torque applied by the driving shaft to shift the rollers to the trailing restricted positions and said mechanism responsive to a braking torque applied by the driving shaft wherein there is a greater braking action of the other of said wheel sets as compared to said one of said wheel sets to shift the rollers to the opened spacings and permit independent braking of said one of said wheel sets.

2. A clutch mechanism as defined by claim 1 wherein the drag shoes are carried by the cage and surround the circular surface of the fixed drag ring, said drag shoes mounted for radial sliding movement toward said circular surfaces, and a wrap spring surrounding said drag shoes and urging the drag shoes against said circular surface.

3. A clutch mechanism as defined in claim 2 wherein the inner race member is provided on the driving shaft and is configured with the cam surfaces.

4. A clutch mechanism as defined in claim 1 wherein anti-lock brakes are provided on the wheels of said one of said wheel sets toward which said driven shaft is extended.

5. In a four-wheel drive vehicle having front and rear wheel sets a driving train interconnecting the wheel sets and independent braking as between the wheel sets, a method of preventing braking power from being transmitted from one wheel set to the other wheel set through the vehicle's drive train which comprises;

providing the driving train with a driving shaft extending from said one wheel set and terminating at an end, and a driven shaft having an end adjacent said driving shaft end and extended from said driving shaft toward said other wheel set, interconnecting said driving shaft end and said drive shaft end with a roller clutch assembly having a drive cam race fixed to the driving shaft and a cylindrical race fixed to the driven shaft, said drive cam race and said cylindrical race forming a configured raceway having alternate positions of restricted and opened positions whereby rollers carried by a cage member are located between said restricted positions in said raceway and are movable from a restricted position to an opened position for clutch engagement and disengagement respectively, frictionally interconnecting the cage member to a non-rotatable member to urge continuous dragging of the cage member and rollers carried thereby while the driving shaft is rotating in either direction to thereby urge the rollers toward the trailing restrictive position of the raceway regardless of the speed of rotation or rate of deceleration of the driving shaft, said roller clutch assembly responding to a braking torque applied by the driving shaft in response to a greater braking action applied to the other wheel set as compared to said one wheel set to thereby move the rollers to the opened position and decouple the driving shaft from the driven shaft to allow independent braking of said one wheel set.

6. A method as defined in claim 5 wherein the cage member carries drag shoes and the non-rotatable member is a non-rotatable drag ring in frictional engagement with the drag shoes, which method further comprises;

applying continuous biased urging of the brake shoes against the drag ring to accommodate wearing and to maintain a desired frictional pressure of the drag shoes against the drag ring for resisting rotation of the cage member and rollers.

7. A method as defined in claim 5 which includes equipping said wheels of said other wheel set with anti-lock brakes.

8. A vehicle comprising;
a front wheel set, a rear wheel set, and a drive train interconnecting said wheel sets in four-wheel drive,
brakes provided on both front wheel set and rear wheel set and anti-lock brakes provided on the wheels of one of said wheel sets,
a driving shaft and a driven shaft provided in said drive train and arranged with the driving shaft having an end terminating adjacent an end of said driven shaft, the driven shaft extended from said driving shaft toward said one of said wheel sets and coupled thereto,
a roller clutch assembly inter-connecting said driving shaft and said driven shaft, said roller clutch assembly comprising;
a drive cam race connected to said driving shaft and a cylindrical cam race connected to said driven shaft and mated to said drive cam race to form a circular raceway therebetween, said drive cam race configured to form alternating positions of restricted and opened spacing in said raceway, rollers positioned in said raceway between said positions of restricted spacing, a cage connected to said rollers and rotatable with said rollers rotated by said drive cam race, and a first friction member carried by said cage, a second friction member having a rate of rotation slower than said driving shaft with the cam race induced to rotate faster than the cylindrical race, and first and second friction members frictionally engaged for urging the rollers to the trailing restrictive spacing and into engagement with the cylindrical race, and means preventing said rollers from moving into engagement with the leading restrictive spacing when the cylindrical race is induced to rotate faster than the cam race,
said roller clutch assembly responsive to a braking torque applied by the driving shaft in response to a greater braking action of the other of said wheel sets as compared to said one of said wheel sets to shift the rollers to the opened spacings and thereby providing decoupling of the races for preventing drive line braking of said one of said wheel sets.

9. A vehicle as defined in claim 8 wherein the second friction member is non-rotatable.

10. A vehicle as defined in claim 9 wherein the second friction member is a non-rotating drag ring and the first friction member is a drag shoe carried by said cage, and means urging said drag shoe toward said friction ring to maintain frictional engagement throughout the wear life of said shoe.

11. A vehicle as defined in claim 8 wherein the anti-lock brakes are provided on the wheels of the rear wheel set.

12. A vehicle as defined in claim 10 wherein the anti-lock brakes are provided only on the wheels of said one of said wheel sets.

* * * * *